United States Patent
Carr et al.

(10) Patent No.: US 10,073,740 B2
(45) Date of Patent: Sep. 11, 2018

(54) FAILURE RESILIENCY PROVISIONING

(71) Applicant: Amazon Technologies, Inc., Seattle, WA (US)

(72) Inventors: Jacob S. Carr, Seattle, WA (US); Eric Brandwine, Haymarket, VA (US); Christopher Richard Jacques de Kadt, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 614 days.

(21) Appl. No.: 14/596,718

(22) Filed: Jan. 14, 2015

(65) Prior Publication Data

US 2015/0127981 A1    May 7, 2015

Related U.S. Application Data

(63) Continuation of application No. 13/008,069, filed on Jan. 18, 2011, now Pat. No. 8,966,037.

(51) Int. Cl.
| | |
|---|---|
| *G06F 15/173* | (2006.01) |
| *G06F 11/14* | (2006.01) |
| *G06F 11/07* | (2006.01) |
| *G06F 9/50* | (2006.01) |
| *G06F 11/00* | (2006.01) |

(52) U.S. Cl.
CPC ......... *G06F 11/142* (2013.01); *G06F 9/5072* (2013.01); *G06F 11/008* (2013.01); *G06F 11/076* (2013.01)

(58) Field of Classification Search
None
See application file for complete search history.

(56) References Cited

U.S. PATENT DOCUMENTS

| | | | |
|---|---|---|---|
| 8,037,475 B1 | 10/2011 | Jackson | |
| 2003/0187967 A1* | 10/2003 | Walsh | ................. H04L 41/0672 709/223 |

(Continued)

OTHER PUBLICATIONS

Peebles, "Probability, Random Variables, and Random Signal Principles," Mc-Graw-Hill Inc., Fourth Edition, p. 21, 2001.

*Primary Examiner* — Mohamed A Wasel
*Assistant Examiner* — Tsung Y Wu
(74) *Attorney, Agent, or Firm* — Thomas Horstemeyer, LLP; Michael J. D'Aurelio; Jason M. Perilla

(57) ABSTRACT

Aspects of provisioning computing units based on improved failure resiliency are described. In one embodiment, an infrastructure component shared between a pair of computing units is identified. A failure rate for the infrastructure component is obtained, and a failure probability for a class of assigned computing units is computed based in part on the failure rate. A spread request related to the class of assigned computing units is also received. In response to the spread request, an altered composition of computing units is determined, and a difference between a failure probability for the altered composition of computing units and the failure probability for the class of assigned computing units is computed. In one embodiment, when a spread score improvement value associated with the difference meets a spread criteria of the spread request, the altered composition of computing units may be provisioned for use.

20 Claims, 6 Drawing Sheets

(56) References Cited

U.S. PATENT DOCUMENTS

2008/0261610 A1* 10/2008 Villier .................. H04W 16/06
                                                      455/452.1
2010/0191854 A1   7/2010 Isci et al.
2010/0250642 A1*  9/2010 Yellin ................. G06F 11/3409
                                                      709/201
2011/0022444 A1   1/2011 Fridman et al.

* cited by examiner

FAILURE RESILIENCY PROVISIONING

CROSS-REFERENCE TO RELATED APPLICATIONS

This application claims the benefit of U.S. Non-Provisional application Ser. No. 13/008,069, filed Jan. 18, 2011, the entire content of which is hereby incorporated herein by reference.

BACKGROUND

Various forms of shared computing resources have been implemented. As one example, a shared computing resource may include multiple networked computing devices executing one or more applications, such as a web server. The operator of the network computing devices may make the shared computing resource available to a customer for a fee. The operator may wish to conceal information about the multiple networked computing devices, such as the physical location of the devices, from the customer. Such concealment allows the operator more flexibility in relocating physical resources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to placement of computing units allocated to customers in a networked plurality of computing units, such as a cloud computing system. The placement takes into account how likely it is that a failure of one of the customer's computing units will also cause another of the customer's computing units to fail. The placement takes into account a spread score, which measures how resilient one computing unit is to failure of other computing units, or conversely, how susceptible the operation of one computing unit is to impact from the failure of other computing units.

The spread score may take into account multiple axes or dimensions. The dimension may be related to physical proximity. For example, computing units in different data centers in the same city have failure probabilities which are correlated to some degree because the units share, for example, the same main power feed from the utility provider. As another example, computing units located in the same rack may have failure probabilities which are correlated to some degree because the units share the same power supply or cooling unit. The dimension may be related to network topology, for example, computing units may be supplied by different network transit providers even when located in the same data center, while computing units in different data centers may be supplied by the same network transit provider.

Figure 1:
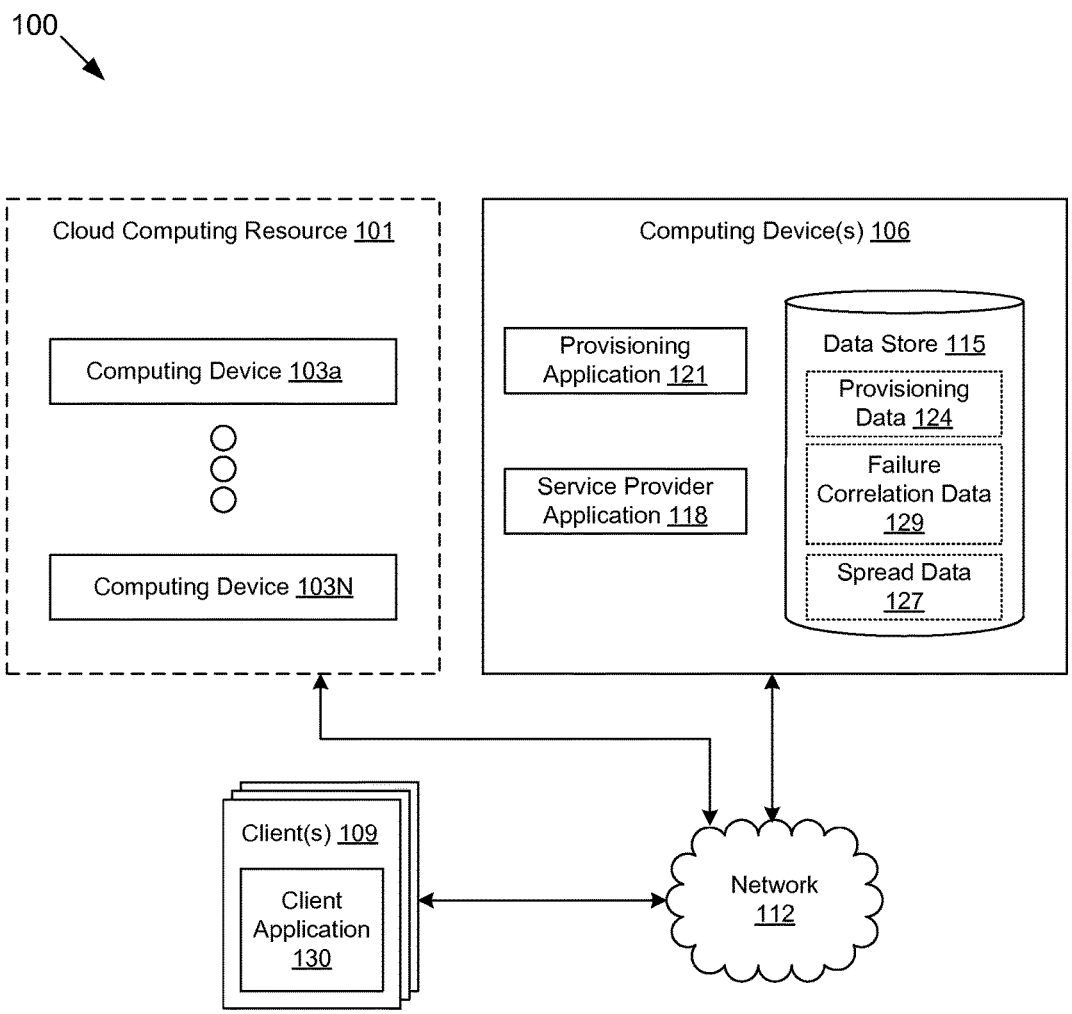
FIG. 1 is a drawing of a networked environment according to one embodiment of the present disclosure.

With reference to FIG. 1, shown is a networked environment 100 according to various embodiments. The networked environment 100 includes a cloud computing system 101 comprising a networked plurality of one or more computing units 103A . . . 103N. The networked environment 100 also includes one or more computing devices 106 and one or more client devices 109. The cloud computing system 101, the computing device 106, and the client device 109 are in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

The cloud computing system 101 may comprise a multitude of networked computing units 103. Each computing unit 103 may comprise, for example, a server computer or any other system providing computing capacity. The cloud computing system 101 may be controlled and managed by a provider entity that provides access to resources of the cloud computing system 101 to customers for a fee under a utility computing model. The term "cloud computing" is not intended to be limiting. It is understood that the cloud computing system 101, as used herein, may refer to any plurality of networked computing units 103.

The computing units 103 may correspond to differing hardware platforms and may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. The computing units 103 may be executing instances of virtual machines used to provide general computing capability to customers. Customers may be capable of terminating machine instances or launching machine instances whenever they desire, thereby providing an elastic computing resource.

The computing device 106 may comprise for example, a server computer or any other system providing computing capability. Alternatively, a plurality of computing devices 106 may be employed that are arranged, for example, in one or more server banks or computer banks or other arrangements. For purposes of convenience, the computing device 106 is referred to herein in the singular. Even though the computing device 106 is referred to in the singular, it is understood that a plurality of computing device 106 may be employed in various arrangements.

Various applications and/or other functionality may be executed in the computing device 106 according to various embodiments. Also, various data is stored in a data store 115 that is accessible to the computing device 106. The data store 115 may be representative of a plurality of data stores as can be appreciated. The data stored in the data store 115, for example, is associated with the operation of the various applications and/or functional entities described below.

The components executed on the computing device 106 include, for example, a service provider application 118 and a provisioning application 121. The components executed on the computing device 106 may also include other applications, services, processes, systems, engines, or functionality not discussed in detail herein. The data stored in the data store 115 includes data accessed by the components executing on the computing device 106, for example, provisioning data 124, spread data 127, and failure correlation data 129, as well as potentially other data.

The provisioning application 121 is executed to allocate compute capacity of the cloud computing system 101 to customers and/or to services. The service provider application 118 is executed to provide computing services to one or more customers or tenants. Examples of such computing services include, but are not limited to, web hosting services, electronic marketplace hosting services, cloud computing services, cloud storage services, and virtual network services. The services provided by the service provider application 118 rely on compute capacity allocated by the provisioning application 121.

The client device 109 is representative of a plurality of client devices that may be coupled to the network 112. The client device 109 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 109 may be configured to execute various applications such as a client application 130 and other applications. The client application 130 may be executed in a client device 109, for example, to use services provided by the service provider application 118. The client device 109 may be configured to execute applications beyond client application 130 such as, for example, a browser, email applications, instant message applications, and/or other applications.

Next, a general description of the operation of the various components of the networked environment 100 is provided. As noted above, the provisioning application 121 allocates compute capacity of the cloud computing system 101 to customers, or to services on behalf of customers. The allocation requests may originate from the client application 130 or from another application executing on the client device 109. A customer's view of the compute capacity is logical. That is, the customer requests a group of logical computing resources, referred to herein as a "class," and the provisioning application 121 assigns a group of actual computing resources to this customer to fulfill this request. The computing unit 103 is the smallest unit of computing resource which can be assigned. The logical resource request from the customer may specify criteria, such as the number of computing units requested and the minimum capacity of the computing units (e.g., high-speed CPU, small disk, etc.).

In response to the request for allocation of compute capacity, the provisioning application 121 provisions a group of computing units 103 for use by the requesting client or service. More specifically, the provisioning application 121 uses the provisioning data 124 to determine which computing units 103 are available for use. The provisioning application 121 further determines which of the available computing units 103 meet the customer's criteria as expressed in the allocation request. After identifying a specific combination of available computing units 103, the provisioning application 121 completes the provisioning by updating the provisioning data 124 to show the requesting customer as owner of the identified computing units 103.

As explained above, the customer has a logical view of the allocated computing units 103 rather than specific information about how those units are distributed within the cloud computing system 101. Hiding most of the physical configuration details from the customer allows the operator of the cloud computing system 101 flexibility in how the computing units 103 are arranged. However, the provisioning application 121 may provide customers with a limited amount of information about the diversity or spread of the computing units 103 assigned to that customer, and a limited amount of control over the spread. As explained below, spreading computing units 103 reduces the risk that failure of one computing unit 103 will result in failure of another computing unit 103

The cloud computing system 101 is arranged as a hierarchy, with computing units 103 at the bottom. A region includes multiple data centers and each data center includes multiple rooms. Each room includes multiple racks, and each rack includes multiple computing units 103. A computing unit 103 may take the form of a physical computing device or a virtual machine implemented on a physical computing device.

As used herein, geographic spread is a measure of how widely a given group of computing units 103 is distributed within the hierarchy. A group of computing units 103 located on different racks has more geographic spread than a group of computing units 103 located on the same rack. Similarly, a group of computing units 103 located in different rooms has more geographic spread than a group of computing units 103 located in the same room.

Geographic spread among the computing units 103 assigned to a customer is desirable because computing units 103 share level-specific infrastructure at each level of the hierarchy, which leads to correlated failures. For example, computing units 103 on the same rack may share the same network switch and power supply. Computing units 103 in the same room may share the same power supply and cooling apparatus. Computing units 103 in the same data center may share the same Internet access provider. Computing units 103 in the same region may share the portions of the Internet core. Failure of shared infrastructure results in failure of multiple computing units 103 using that infrastructure.

The provisioning application 121 therefore provides some degree of customer control over the geographic spread of the computing units 103 assigned to that customer. Specifically, a customer can direct the provisioning application 121 to spread the assigned computing units 103 according to a spread criteria. If the current configuration of assigned computing units 103 does not meet the specified spread criteria, the provisioning application 121 may alter the configuration accordingly. To that end, the provisioning application 121 may substitute a computing unit 103 from the customer's configuration with another computing unit 103 in a different rack, room, data center, or region, as appropriate. Other substitutions may be performed to achieve the customer's desired spread criteria.

As explained above, the customer has a logical view of the allocated computing units 103, so the customer identifies the assigned configuration by a logical identifier. When the spread process is complete, the same logical identifier applies to the assigned configuration, although the underlying computing units 103 may have changed.

The provisioning application 121 may also provide the customer with the measure of geographic spread for the configuration assigned to the customer. This measure of spread may be provided, for example, in response to a request received from the client application 130 or from another application executing on the client device 109.

Some embodiments of the provisioning application 121 deal with a measure of clustering rather than spread, where clustering is inversely related to spread. Thus, where the provisioning application 121 attempts to obtain a configuration which meets or exceeds a spread criteria, the provisioning application 121 attempts to obtain a configuration with a cluster score that is lower than the customer's request. In other words, a customer that specifies a clustering score is requesting low spread. Various differences between spread and clustering are explained herein, but the techniques described herein for spread can generally be adapted for clustering, as should be appreciated.

Figure 2:
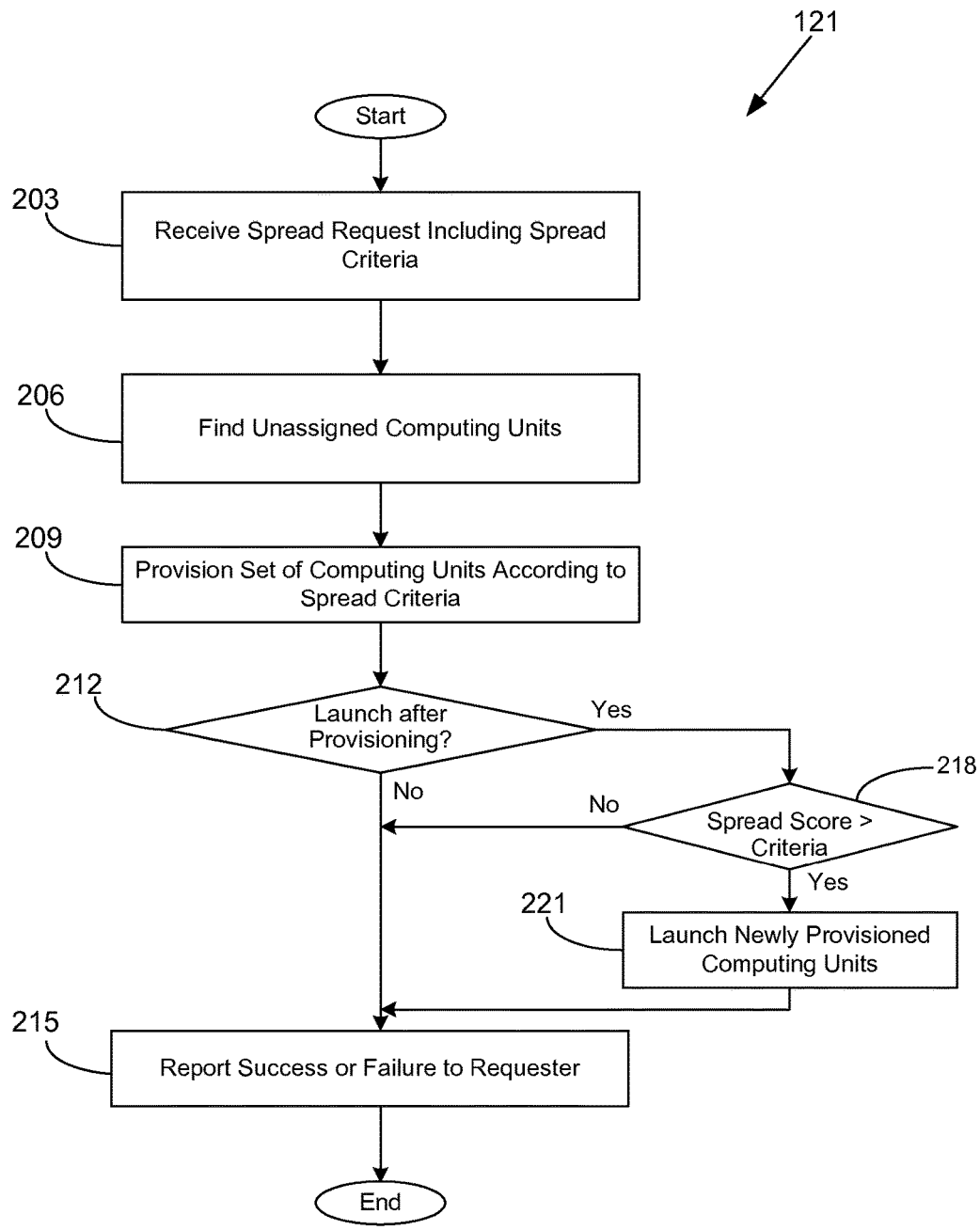
FIG. 2 is a flowchart illustrating an example of functionality implemented as portions of a provisioning application executed in a computing device in the networked environment of FIG. 1 according to various embodiments of the present disclosure.

Moving on to FIG. 2, shown is a flowchart that provides one example of the operation of a portion of the provisioning application 121 (FIG. 1) according to various embodiments. It is understood that the flowchart of FIG. 2 provides merely an example of the many different types of functional arrangements that may be employed to implement the operation of the portion of the provisioning application 121 as described herein. As an alternative, the flowchart of FIG. 2 may be viewed as depicting an example of steps of a method implemented in the computing device 106 (FIG. 1) according to one or more embodiments.

FIG. 2 describes how some embodiments of the provisioning application 121 perform a placement that accounts for spread. Beginning at box 203, the provisioning application 121 receives a placement request for a class of computing resources already assigned to a particular customer. The request may include a spread criteria. At box 206 the provisioning application 121 uses provisioning data 124 in the data store 115 (FIG. 1) to determine which computing units 103 within the cloud computing system 101 (FIG. 1) are currently unassigned and thus available to fulfill the placement request. Next, at box 209 the provisioning application 121 attempts to provision a particular combination of computing units 103 for use by the requester in accordance with a spread criteria. The combination may include computing units 103 already assigned to the requester and/or unassigned computing units 103. The placement process is based on failure correlation data 129, described in more detail below. If the request received at box 203 does not include a spread criteria, a default criteria may be used. The provisioning process of box 209 generates a spread score for the customer's configuration, which is stored in spread data 127 (FIG. 1) in the data store 115.

Next, at box 212, the provisioning application 121 determines whether the newly provisioned configuration should be launched as part of the provisioning process. If it is determined at box 212 that the provisioning does not include a launch, the provisioning application 121 continues at box 215, where the success or failure of the placement is reported to the client that is requesting the provisioning, where success is defined as meeting the requested spread criteria. In some embodiments, the report also includes the computed spread score.

If it is determined at box 212 that the provisioning does include a launch, the provisioning application 121 continues at box 218. At box 218, the provisioning application 121 compares the spread criteria computed by box 209 with the spread score. If the spread score meets or exceeds the spread criteria, the provisioning application 121 launches computing resources associated with the newly provisioned computing units 103 at box 221. Such resources may include virtual machines, storage devices, or other types of computing resources, as should be appreciated.

After launching, the provisioning application 121 moves to box 215, where a successful completion of the placement is reported to the client. If the spread score does not meet or exceed the spread criteria, then provisioning application 121 does not launch, but instead continues at box 215, where the failure is reported to the client. The process of FIG. 2 is then complete.

The process of FIG. 2 is described in terms of a single placement for a particular spread, but the process can be invoked again. In this manner, computing resources assigned to a particular customer can be initially placed using one criteria, and then later the customer can request a placement with a different criteria.

Figure 3:
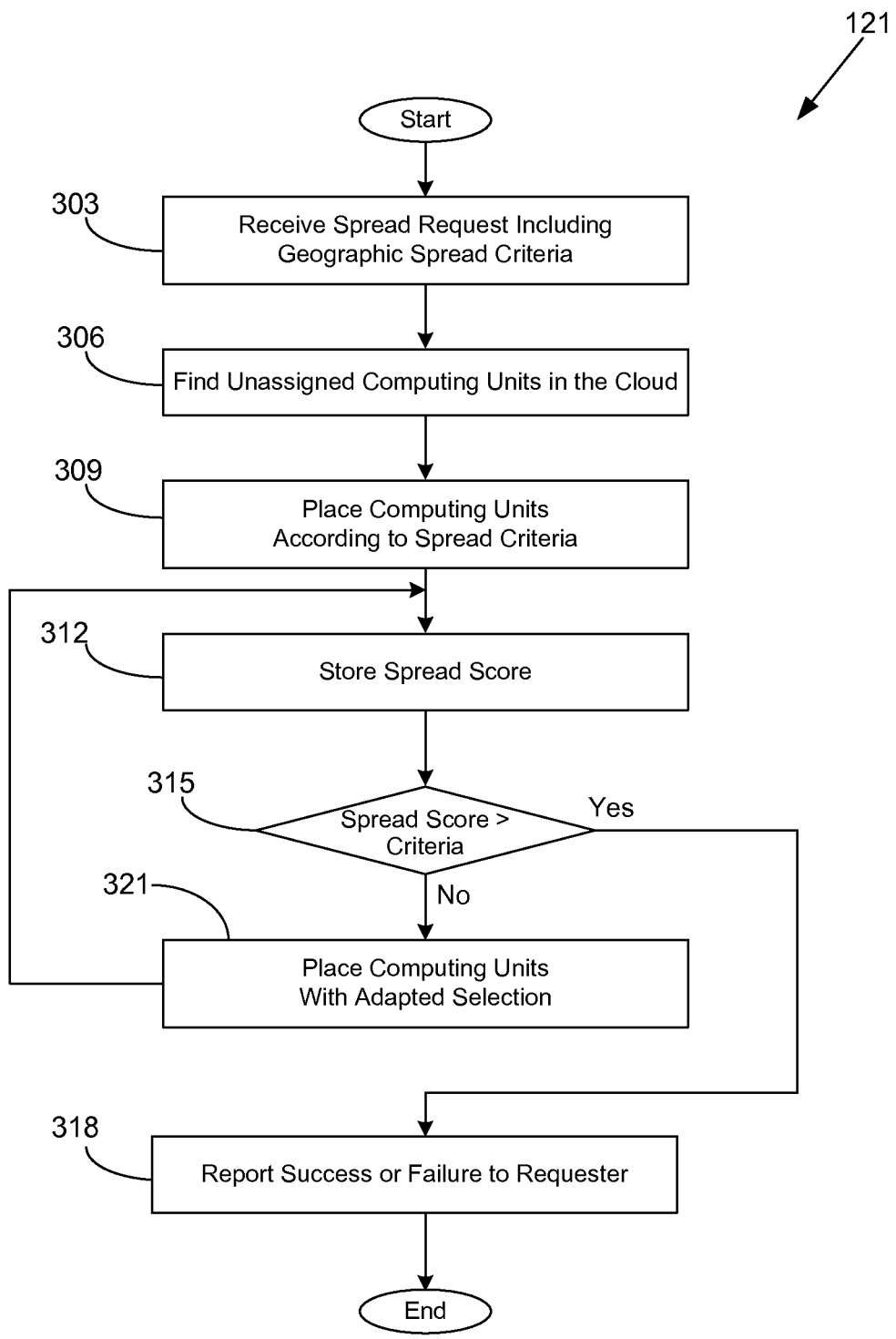
FIG. 3 is a flowchart illustrating an example of functionality implemented as portions of a provisioning application executed in a computing device in the networked environment of FIG. 1 according to various embodiments of the present disclosure.

With reference now to FIG. 3, shown is a flowchart that provides one example of the operation of a portion of the provisioning application 121 (FIG. 1) according to various embodiments. It is understood that the flowchart of FIG. 3 provides merely an example of the many different types of functional arrangements that may be employed to implement the operation of the portion of the provisioning application 121 as described herein. As an alternative, the flowchart of FIG. 3 may be viewed as depicting an example of steps of a method implemented in the computing device 106 (FIG. 1) according to one or more embodiments.

FIG. 3 describes how some embodiments of the provisioning application 121 place computing units 103 (FIG. 1) to meet a spread criteria. The placement described in connection with FIG. 3 is an iterative process, in which an initial placement is performed and then additional placements may be attempted as the availability and distribution of computing units 103 within the cloud computing system 101 changes over time. In contrast, the spread described earlier in conjunction with FIG. 2 is a single attempt.

Beginning at box 303, the provisioning application 121 receives a placement request for a class of computing resources already assigned to a particular customer. The request may include a spread criteria, expressed as a range, i.e., a minimum spread and a desired spread. At box 306 the provisioning application 121 uses provisioning data 124 in the data store 115 (FIG. 1) to determine which computing units 103 within the cloud computing system 101 (FIG. 1) are currently unassigned and thus available to fulfill the spread request.

The provisioning application 121 performs an initial placement at box 309, by attempting to provision a particular combination of computing units 103 for use by the requester in accordance with the minimum spread specified in the spread criteria. The combination may include computing units 103 already assigned to the requester and/or unassigned computing units 103. The placement process is based on failure correlation data 129, described in more detail below. The initial placement generates a spread score for the current configuration. At box 312, the current score is stored as spread data 127 in the data store 115 (FIG. 1).

At box 315, the provisioning application 121 compares the most recent spread score with the desired spread from the customer's request. If at box 315 it is determined that the desired spread has been reached, the provisioning application 121 continues at box 318, where successful placement is reported to the requester. In some embodiments, the report also includes the computed spread score.

If at box 315 it is determined that the desired spread has not been reached, the provisioning application 121 continues at box 321. At box 321 the provisioning application 121 performs another placement. In doing so, the provisioning application 121 attempts to improve the spread by adapting its selection of computing units 103. As one example, the provisioning application 121 may include a randomness factor in selecting computing units 103. As another example, the provisioning application 121 may rank the possible configurations of computing units 103 by spread score and pick the highest ranked configuration. As yet another example, the provisioning application 121 may select computing units 103 based on knowledge about the topology and/or hierarchy of the cloud computing system 101.

Having performed another placement at box 321, the provisioning application 121 continues at box 312, where the spread score for the current configuration is stored in the data store 115. Next, at box 315 the provisioning application 121 compares the most recent spread score with the desired spread from the customer's request. If at box 315 it is determined that the desired spread has been reached, the provisioning application 121 reports the score at box 318 (described above), and the process is complete.

If at box 315 it is determined that the desired spread has not been reached, the provisioning application 121 performs another placement (box 321), once again adapting the selection of computing units 103 in some manner. If the desired spread is eventually reached, the process ends. The process may also end after a predetermined number of iterations, after a predetermined time period, when improvements in the spread score start diminishing, or other suitable criteria for ending, as should be appreciated. In some embodiments, a delay occurs between spread attempts. It is likely that the availability of computing units 103 will change over time, so such a delay may increase the likelihood of increasing the spread score. The process of FIG. 3 is then complete.

The placement processes described in FIGS. 2 and 3 were described in terms of a placement request for a single customer. Other embodiments may take into account across the cloud computing system 101 as a whole when fulfilling a request, so that computing units allocated to one customer may be re-provisioned to fulfill a placement request by another customer. For example, a computing unit from a particular group A (e.g., a data center) may be needed to fulfill customer X's spread criteria, but all computing units in that group are allocated to customers Y and Z. An embodiment may take into account placement across the cloud computing system 101 as a whole in order to fulfill the latest request. The embodiment may, for example, perform another placement for customer Y which moves one of customer Y's units to group B, which frees up a unit in group A for use by customer X. In doing so, the embodiment would attempt to meet the spread criteria of all customers, and would inform all affected customers if the criteria was not met.

Taking multiple customers into account during the placement process can produce better distribution of resources for the cloud computing system 101 as a whole. Using such a strategy, a particular individual placement might reduce the overall system spread, but as placements for different customers are performed over time, the overall system spread can be improved relative to a naïve placement strategy which considers only the spread of an individual customer.

Figure 4:
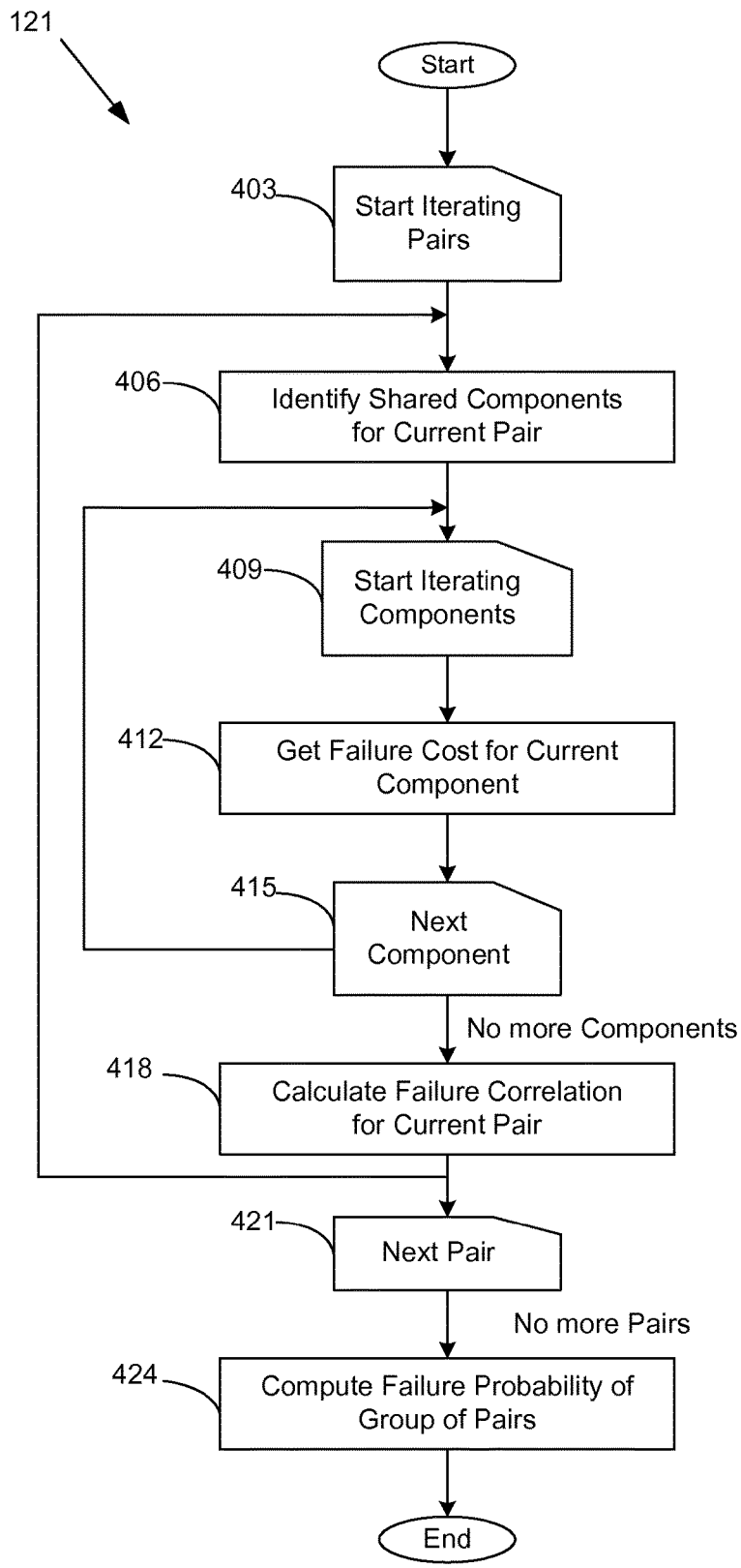
FIG. 4 is a flowchart illustrating an example of functionality implemented as portions of a provisioning application executed in a computing device in the networked environment of FIG. 1 according to various embodiments of the present disclosure.

Turning now to FIG. 4, shown is a flowchart that provides one example of the operation of a portion of the provisioning application 121 (FIG. 1) according to various embodiments. It is understood that the flowchart of FIG. 4 provides merely an example of the many different types of functional arrangements that may be employed to implement the operation of the portion of the provisioning application 121 as described herein. As an alternative, the flowchart of FIG. 4 may be viewed as depicting an example of steps of a method implemented in the computing device 106 (FIG. 1) according to one or more embodiments.

FIG. 4 describes how some embodiments of the provisioning application 121 calculate a spread score for a group of computing units 103 (FIG. 1) assigned to a customer. Beginning at box 403, the provisioning application 121 starts an iteration loop to compare all possible pairs of the computing units 103 assigned to the customer, starting with a first pair. Next, at box 406, the provisioning application 121 uses information stored in the provisioning data 124 (FIG. 1) about the hierarchical arrangement of the cloud computing system 101 to identify infrastructure components that are shared between the current pair of computing units 103. As mentioned above, shared components may include, for example, power supplies, cooling units, network routers, etc. At box 409, the provisioning application 121 begins an inner iteration loop to process each of the shared components. Next, at box 412 the provisioning application 121 obtains a failure cost for the current shared component from the failure correlation data 129 (FIG. 1). The failure cost may be expressed in terms of probability of failure, mean time to repair, mean time between failures, annualized failure rate, etc. The failure cost parameter may be relative to other components rather than absolute. The term "cost" is not meant to suggest that monetary units are involved, and the cost parameter is not limited to monetary units. At box 415, the provisioning application 121 moves to the next shared component, and the inner iteration loop repeats at box 412 until all shared components for the current pair of computing units 103 have been processed.

Once all failure cost values for the shared components of the current pair of computing units 103 have been obtained, the provisioning application 121 continues processing the current pair at box 418. At box 418, the provisioning application 121 calculates a failure correlation for the current pair by summing the failure cost of shared components. This total cost is then subtracted from 1 to obtain a probability of failure for the current pair, and the probability is stored in the failure correlation data 129. Next, at box 421 the provisioning application 121 moves to another pair of computing units 103 assigned to the customer, and the outer iteration loop repeats at box 406 until all pairs assigned to the customer have been processed.

Once the inner and outer loops have computed a probability of failure for all pairs in the group of computing units 103 assigned to the customer, the provisioning application 121 exits the loops and continues processing at box 424. At box 424, the provisioning application 121 computes the failure probability of the group as a whole by computing the product of the individual pair failure probabilities. This failure probability serves as the spread score. The process of FIG. 4 is then complete.

Although the process of FIG. 4 iterates through all pairs and all shared components, another embodiment does not take into account all pairs, but instead stops iterating when a particular pair falls below a threshold. Yet another embodiment may exclude entire groups of computing units 103 which share a particular resource, e.g., when the spread criteria is above a particular threshold, all computing units 103 in the same data center are excluded.

Figure 5:
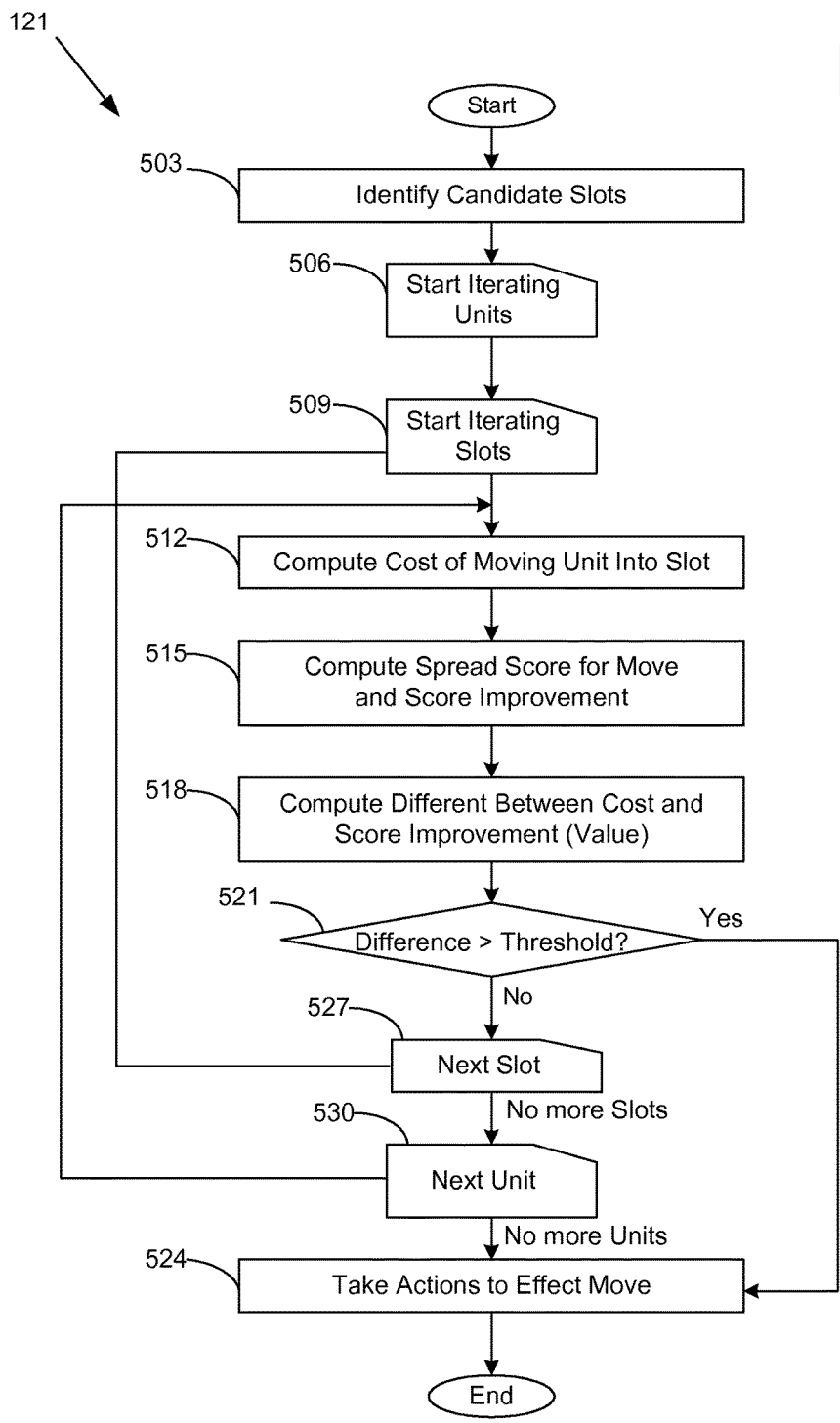
FIG. 5 is a flowchart illustrating an example of functionality implemented as portions of a provisioning application executed in a computing device in the networked environment of FIG. 1 according to various embodiments of the present disclosure.

With reference now to FIG. 5, shown is a flowchart that provides one example of the operation of a portion of the provisioning application 121 (FIG. 1) according to various embodiments. It is understood that the flowchart of FIG. 5 provides merely an example of the many different types of functional arrangements that may be employed to implement the operation of the portion of the provisioning application 121 as described herein. As an alternative, the flowchart of FIG. 5 may be viewed as depicting an example of steps of a method implemented in the computing device 106 (FIG. 1) according to one or more embodiments.

FIG. 5 describes how some embodiments of the provisioning application 121 attempt to improve the customer's spread score. One mechanism for changing the score is altering the composition of the group of computing units 103 (FIG. 1) assigned to a customer, e.g., swapping unit XYZ for unit ABC. Another mechanism for changing the score is moving one or more of the currently assigned computing units 103 to another location within the hierarchy of the cloud computing system 101 (FIG. 1).

Beginning at box 503, the provisioning application 121 uses information stored in the provisioning data 124 (FIG. 1) about the hierarchical arrangement of the cloud computing system 101 to identify a set of candidate "slots," where slots encompass both unassigned computing units 103 as well as open locations in the hierarchy (e.g., empty slot in a rack, empty port in a router, etc.) At box 506, the provisioning application 121 starts an outer iteration loop which handles each of the computing units 103 assigned to the customer, starting with a first unit. Next, at box 509, the provisioning application 121 starts an inner iteration loop which handles each of the identified slots. At box 512, the provisioning application 121 computes the cost of moving the current computing unit 103 into the current slot.

If the slot is an open location, the computed cost is that of physically moving the appropriate resource of the currently assigned computing unit 103 to the open location (e.g., moving the unit to an open rack slot, moving the unit's network connection to an open router port, etc.) If the slot is an unassigned computing unit 103, various types of moves or substitutions can be considered, with an appropriate cost for each. One example is a "cold migration" in which the computing unit 103 currently used by the customer is shut down, the customer's software and data is moved to the unassigned computing unit 103, and the new unit is started up. Another example is a "live migration" in which the customer's software and data is moved to the unassigned computing unit 103 while the computing unit 103 currently used by the customer is still running, so that the customer experiences minimal interruption.

Having determined the cost of moving the current computing unit 103 into the current slot, at box 515 the provisioning application 121 computes the spread score for a potential configuration that takes into account the move. The provisioning application 121 then determines how much the score would improve as a result of the move. This score improvement can be viewed as the value of the move.

The provisioning application 121 then balances the value of the move against the cost of the move as follows. At box 518, the provisioning application 121 computes the difference between the cost and the value. Next, at box 521 the provisioning application 121 compares the computed difference to a predetermined threshold. That is, the move is considered to be worth the cost if the threshold is exceeded. If at box 521 it is determined that the difference exceeds the threshold, the provisioning application 121 takes action to accomplish the move at box 524. Depending on the type of move (physical move, cold migration, live migration, etc.) those actions may include updating the provisioning data 124, notifying personnel responsible for infrastructure in the cloud computing system 101, or other suitable actions. Having taken these actions, the process of FIG. 5 is then complete.

If at box 521 it is determined that the difference between move cost and move value does not exceed the threshold, the provisioning application 121 moves to box 527. At box 527, the next candidate slot is considered and the inner iteration loop repeats at box 509 until all slots have been processed. When all slots have been processed, the provisioning application 121 moves to box 530. At box 530 the next computing unit 103 assigned to the customer is considered, and the outer iteration loop repeats at box 506 until all units have been processed. The process of FIG. 5 is then complete.

Figure 6:
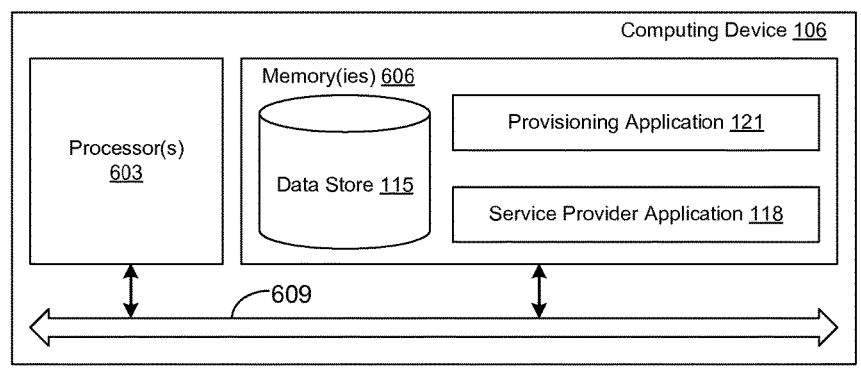
FIG. 6 is a schematic block diagram that provides one example illustration of a computing device employed in the networked environment of FIG. 1 according to various embodiments of the present disclosure.

Moving on to FIG. 6, shown is a schematic block diagram of the computing device 106 according to an embodiment of the present disclosure. The computing device 106 includes at least one processor circuit, for example, having a processor 603 and a memory 606, both of which are coupled to a local interface 609. To this end, the computing device 106 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the provisioning application 121, the service provider application 118, and potentially other applications. Also stored in the memory 606 may be a data store 115 and other data. In addition, an operating system may be stored in the memory 606 and executable by the processor 603. While not illustrated, the client device 109 (FIG. 1) also includes components like those shown in FIG. 6, whereby the client application 130 (FIG. 1) is stored in a memory and executable by a processor.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors and the memory 606 may represent multiple memories that operate in parallel processing circuits, respectively. In such a case, the local interface 609 may be an appropriate network 112 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the provisioning application 121, the service provider application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-7 show the functionality and operation of an implementation of portions of the provisioning application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in flowcharts of FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the provisioning application 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying computer-readable instructions stored thereon that, when executed by at least one computing device, direct the at least one computing device to:

identify, for at least one pair of computing units in a class of assigned computing units, a plurality of infrastructure components shared between the at least one pair of computing units;

obtain a failure rate for individual ones of the plurality of infrastructure components;

compute a failure probability for the at least one pair of computing units in the class of assigned computing units based in part on a sum of the failure rate for the individual ones of the plurality of infrastructure components shared between the at least one pair of computing units;

compute, in response to receipt of a spread request related to the class of assigned computing units, an altered failure probability for an altered composition of the class of assigned computing units based in part on a sum of a failure rate for individual ones of a plurality of other infrastructure components shared between at least one other pair of computing units in the altered composition of the class of assigned computing units;

compute a difference in failure resiliency between the failure probability for the class of assigned computing units and the altered failure probability for the altered composition of the class of assigned computing units; and provision the altered composition of the class of assigned computing units when the difference in failure resiliency meets a spread criteria of the spread request.

2. The non-transitory computer-readable medium of claim 1, wherein the at least one computing device is further directed to:

compute a cost of migrating the class of assigned computing units to the altered composition of the class of assigned computing units; and compute a difference between the cost of migrating and the difference in failure resiliency as a basis for migrating to the altered composition of the class of assigned computing units.

3. The non-transitory computer-readable medium of claim 2, wherein the at least one computing device is further directed to:

identify a plurality of candidate slots for the altered composition of the class of assigned computing units; and compute, for at least one of the plurality of candidate slots, a cost of migrating at least one computing unit in the class of assigned computing units into the at least one of the plurality of candidate slots.

4. A method, comprising:

identifying, via at least one of one or more computing devices, a plurality of infrastructure components shared between at least one pair of computing units in a class of assigned computing units;

obtaining, via at least one of the one or more computing devices, a failure rate for individual ones of the plurality of infrastructure components;

computing, via at least one of the one or more computing devices, a failure probability for the at least one pair of computing units in the class of assigned computing units based in part on a sum of the failure rate for the individual ones of the plurality of infrastructure components;

receiving, via at least one of the one or more computing devices, a spread request related to the class of assigned computing units;

in response to the spread request, computing, via at least one of the one or more computing devices, an altered failure probability for an altered composition of the class of assigned computing units based in part on a sum of a failure rate for individual ones of a plurality of other infrastructure components shared between at least one other pair of computing units in the altered composition of the class of assigned computing units;

computing, via at least one of the one or more computing devices, a difference in failure resiliency between the failure probability for the class of assigned computing units and the altered failure probability for the altered composition of the class of assigned computing units; and provisioning, via at least one of the one or more computing devices, the altered composition of the class of assigned computing units when the difference in failure resiliency meets a spread criteria of the spread request.

5. The method of claim 4, wherein the spread criteria comprises a range.

6. The method of claim 4, wherein the provisioning comprises provisioning, via at least one of the one or more computing devices, the altered composition of the class of assigned computing units when the difference in failure resiliency meets the spread criteria of the spread request and is greater than a threshold.

7. The method of claim 4, further comprising:

computing, via at least one of the one or more computing devices, a cost of migrating the class of assigned computing units to the altered composition of the class of assigned computing units; and computing, via at least one of the one or more computing devices, a difference between the cost of migrating and the difference in failure resiliency as a basis for migrating to the altered composition of the class of assigned computing units.

8. The method of claim 4, wherein determining the altered composition of the class of assigned computing units comprises:

identifying, via at least one of the one or more computing devices, a plurality of candidate slots for the altered composition of the class of assigned computing units; and for at least one of the plurality of candidate slots, computing, via at least one of the one or more computing devices, a cost of migrating at least one computing unit in the class of assigned computing units into the at least one of the plurality of candidate slots.

9. The method of claim 4, wherein the failure rate for the individual ones of the infrastructure components is expressed in terms of at least one of mean time between failure, mean time to repair, or annualized failure rate.

10. The method of claim 4, wherein the individual ones of the infrastructure components include at least one power supply, cooling apparatus, or network switch shared between the pair of computing units.

11. The method of claim 4, further comprising:

for individual ones of the pair of computing units in the class of assigned computing units, identifying, via at least one of the one or more computing devices, a plurality of infrastructure components shared between the pair of computing units;

obtaining, via at least one of the one or more computing devices, a failure rate for individual ones of the plurality of infrastructure components; and based in part on a sum of the failure rate for individual ones of the plurality of infrastructure components, computing, via at least one of the one or more computing devices, a failure correlation for the pair of computing units.

12. The method of claim 11, further comprising computing, via at least one of the one or more computing devices, the failure probability for the class of assigned computing units based in part on the failure correlation for individual ones of the pair of computing units in the class of assigned computing units.

13. A system, comprising:
a memory device to store computer-readable instructions thereon; and
at least one computing device directed, through execution of the computer-readable instructions, to:
identify a plurality of infrastructure components shared between at least one pair of computing units in a subset of computing units;
obtain a failure rate for individual ones of the plurality of infrastructure components;
compute a failure probability for the at least one pair of computing units in the subset of computing units based in part on a sum of the failure rate for the individual ones of the plurality of infrastructure components;
receive a spread request related to the subset of computing units;
compute, in response to the spread request, an altered failure probability for an altered subset of computing units based in part on a sum of a failure rate for individual ones of a plurality of other infrastructure components shared between at least one other pair of computing units in the altered subset of computing units;
compute a spread score improvement value between the failure probability for the subset of computing units and the failure probability for the altered subset of computing units; and
provision the altered subset of computing units when the spread score improvement value meets a spread criteria of the spread request.

14. The system of claim 13, wherein the spread criteria comprises a spread range.

15. The system of claim 13, wherein the at least one computing device is directed to provision the altered subset of computing units when the spread score improvement value meets the spread criteria and is greater than a threshold.

16. The system of claim 13, wherein the at least one computing device is further directed to:
identify a plurality of candidate slots for the altered subset of computing units; and
compute, for at least one of the plurality of candidate slots, a cost of migrating at least one computing unit in the subset of computing units into at least one of the plurality of candidate slots.

17. The system of claim 13, wherein the at least one computing device is further directed to:
compute a cost of migrating the subset of computing units to the altered subset of computing units; and
compute a difference between the cost of migrating and the spread score improvement value as a basis for migrating to the altered subset of computing units.

18. The system of claim 13, wherein the failure rate for the individual ones of the infrastructure components is expressed in terms of at least one of mean time between failure, mean time to repair, or annualized failure rate.

19. The system of claim 13, wherein the individual ones of the infrastructure components include at least one power supply, cooling apparatus, or network switch shared between the pair of computing units.

20. The system of claim 13, wherein the at least one computing device is further directed to:
identify, for individual ones of the pair of computing units in the subset of computing units, a plurality of infrastructure components shared between the pair of computing units;
obtain a failure rate for individual ones of the plurality of infrastructure components; and
based in part on a sum of the failure rate for individual ones of the plurality of infrastructure components, compute a failure correlation for the pair of computing units.

* * * * *